United States Patent [19]
Tsuchida et al.

[11] Patent Number: 5,846,415
[45] Date of Patent: Dec. 8, 1998

[54] APPARATUS FOR REGENERATING FILTER CLOTHES OF FILTER PRESS

[75] Inventors: Kunihiko Tsuchida, Zentsuji; Kazuhisa Otani, Marugame, both of Japan

[73] Assignee: Ishigaki Company Limited, Japan

[21] Appl. No.: 779,483

[22] Filed: Jan. 7, 1997

[30] Foreign Application Priority Data

Oct. 1, 1996 [JP] Japan .................................. 8-260927

[51] Int. Cl.[6] .................................................. B01D 25/34
[52] U.S. Cl. .......................................... 210/225; 210/230
[58] Field of Search .................................. 210/225, 227, 210/229, 230; 100/198

[56] References Cited

U.S. PATENT DOCUMENTS

4,900,454  2/1990  Hedlund et al. ...................... 210/225

Primary Examiner—Matthew O. Savage
Attorney, Agent, or Firm—McDonnell Boehnen Hulbert & Berghoff

[57] ABSTRACT

A vibration rod for simultaneously vibrating upper-portion support bars arranged to be upwards brought into contact with two ends of the upper-portion support bar to simultaneously vibrate the upper-portion support bars is disposed below the bar for supporting the upper portion of each of filter clothes each of which is disposed between filter plates; and washing pipes each having nozzles pointed to the filter cloth from a position above a gap between filter plates are disposed above the filter plates disposed in parallel so that cakes allowed to adhere to the filter clothes are separated by vibrating the filter plates simultaneously with opening of all of the filter plates. Then, washing water sprayed from the nozzles enables all of the filter clothes to simultaneously be washed and regenerated.

6 Claims, 11 Drawing Sheets

APPARATUS FOR REGENERATING FILTER CLOTHES OF FILTER PRESS

BACKGROUND OF THE INVENTION

The present invention relates to an apparatus for regenerating clogged filter clothes of a filter press.

A filter press according to the present invention is used to separate solid components and liquid component in muddy water of earth and soil or slag from each other, and in particular to treat slurry which can relatively easily be filtered. Filter clothes are regenerated such that a plurality of filter plates (filtering chambers) disposed in parallel are simultaneously opened to simultaneously separate cakes and wash the filter clothes.

The filter press of the above-mentioned type having the structure such that the multiplicity of filter plates are simultaneously opened to wash and regenerate the filter clothes has been known as disclosed in Japanese Utility-Model Application Publication No. 5-9046 and Japanese Patent Application Laid-Open No. 8-24518. The filter press disclosed in Japanese Utility-Model Application Publication No. 5-9046 has a structure such that washing pipes disposed above opened filter plates are vertically rotated so as to be moved downwards to the positions among the filter plates when the washing operation is performed. As a means for separating cakes allowed to adhere to the filter clothes, a structure has been disclosed in Japanese Patent Application Publication No. 5-20124 having a structure such that cakes allowed to adhere to the filter clothes are vibrated so as to be separated from the filter clothes.

However, there has been no apparatus of a type which is capable of simultaneously performing separation of cakes formed among the multiplicity of the filter plates and washing of the filter clothes. A portion of slurry pieces can substantially be separated and dropped by simply opening the filter plates, while another portion of slurry pieces cannot be separated by vibrating the filter clothes and thus requires washing.

SUMMARY OF THE INVENTION

The present invention is found to solve the above-mentioned problems and an object of the present invention is to provide an apparatus for regenerating filter clothes which is capable of spontaneously regenerating filter clothes regardless of the characteristics of slurry.

In order to achieve the above-mentioned object, according to one aspect of the present invention, there is provided an apparatus for regenerating filter clothes of a filter press comprising: a plurality of filter plates movably disposed in parallel on a pair of horizontal guide rails; filter clothes each of which is put on filtering surfaces on the right and reverse sides of each of the filter plates; upper-portion support bars each having two ends projecting over two ends of each of the filter clothes to support the upper portion of each of the filter clothes; an opening and closing mechanism for connecting the filter plates to one another and simultaneously opening or closing a plurality of the filter plates; filtering chambers each of which is sectioned and formed between opposite filtering surfaces when the filter plates have been closed and which are opened when the filter plates have been opened; washing pipes each of which is disposed above a gap formed between the filter plates which have been opened and each of which extends along the filtering surface of the filter plate; nozzles provided for each of the washing pipes to spray washing water to each of the filter clothes; a main supply pipe for supplying washing water disposed in the direction of the filter plates and arranged to support ends of the washing pipes; a washing pipe support portion disposed substantially in parallel to the main supply pipe in the direction of the filter plates and arranged to detachably support other ends of the washing pipes; flexible pipes each of which connects the main supply pipe and each of the washing pipes to each other in a communicated state so as to supply washing water from the main supply pipe to each of the washing pipes; and vibration rod disposed below the two ends of the upper-portion support bar so as to be brought into contact with the two ends from a lower position and downwards separated from the same in order to vibrate the upper-portion support bars.

If the filter clothes of the filter press have been clogged, the apparatus for regenerating the filter clothes of the filter press having the structure such that all of the filtering chambers each of which is formed between filtering surfaces of the filter plates are simultaneously opened by opening the filter plates if the filter clothes are clogged so as to cause cakes formed in the filtering chambers to be dropped due to the dead weight. Thus, the cakes can easily be removed.

In a case where cakes, which have not been dropped due to the dead weight, are left on the filter clothes, the upper-portion support bar is vibrated by the vibration rod to vibrate the filter clothes. Thus, the cakes allowed to adhere to the filter clothes and thus left on the filter clothes can be separated and dropped.

If cakes, which could not been separated though they have been vibrated, are left, washing water are sprayed from washing pipes so that cakes clogged in the textures of the filter clothes are completely be removed.

As described above, the apparatus for regenerating filter clothes according to the present invention, having the structure such that the filter plates are opened and vibrated if cakes which cannot be separated are left, is able to easily regenerate the filter clothes. If cakes clogged in the textures of the filter clothes are left, the cakes are washed. As a result, the filter clothes can satisfactorily be regenerated. Therefore, the filter clothes can accurately and satisfactorily be regenerated to correspond to cakes having various characteristics.

When the filter clothes are regenerated, the present invention has the structure such that all of the filtering chambers are simultaneously opened to separate and drop and wash and remove cakes in all of the filtering chambers and on all the filter clothes. Therefore, the operations can significantly efficiently be performed. That is, the above-mentioned batch type filter press has the filtration efficiency which is calculated as the time in which no filtrate nor cake is discharged as a result of the operation of the apparatus. The regenerating apparatus according to the present invention has the structure such that separation of cakes and washing of the filter clothes are simultaneously performed in all of the filtering chambers. Therefore, the time, in which the solid-liquid separation is not performed, can significantly be shortened so that a significantly excellent filtration efficiency is obtained.

Moreover, the apparatus according to the present invention having the structure such that no obstruction exists near (above) the washing pipe enables assembling of the apparatus and the adjustment of the nozzles to be performed easily. Since each of the washing pipes can easily be detached, maintenance can easily be performed.

A structure may be employed in which the opening and closing mechanism have a hydraulic cylinder secured to the guide rails and including a hydraulic piston having a head portion which is moved forwards and rearwards along the guide rails, a movable head attached to the head portion in such a manner that the movable head is able to move forwards and rearwards along the guide rails and connected to the outermost filter plate in the opening direction of the filter plates, and a link chain for connecting the filter plates to one another.

Since the above-mentioned structure has an arrangement such that the mechanism for opening and closing the filter plates is provided individually from the clamping mechanism, the size of the apparatus can be reduced as compared with a structure in which the movable stroke of a clamping cylinder of a clamping mechanism having a large scale hydraulic unit is set to be a large stroke to open and close the filter clothes. Moreover, the filter plate can quickly be opened and closed. Therefore, the regenerating operation can furthermore efficiently be performed.

A structure may be employed in which all of the filter plates are divided into two or more filter plate blocks each of which consists of a plurality of the filter plates, and the main supply pipe has a plurality of washing water passage pipes capable of independently and selectively supplying washing water to an required block.

As a result of employment of the above-mentioned structure, washing water can be supplied to each block. Thus, an operation of washing a block of the filter clothes can be performed, that is, the multiplicity of the filter plates are divided into several blocks so as to be sequentially washed. Thus, the size of the pump for supplying washing water can be reduced and the quantity of washing water can be saved.

Another structure may be employed in which two end portions of the vibration rod are individually operated.

As a result employment of the above-mentioned structure, the two ends of the vibration rod for vibrating the upper-portion support bar are individually operated. Thus, the bar for supporting the upper portions of the filter clothes can strongly be vibrated so that cakes allowed to adhere to the filter clothes can efficiently be separated and removed.

DESCRIPTION OF THE PREFERRED EMBODIMENTS

Referring to the drawings, the present invention will now be described.

Figure 1:
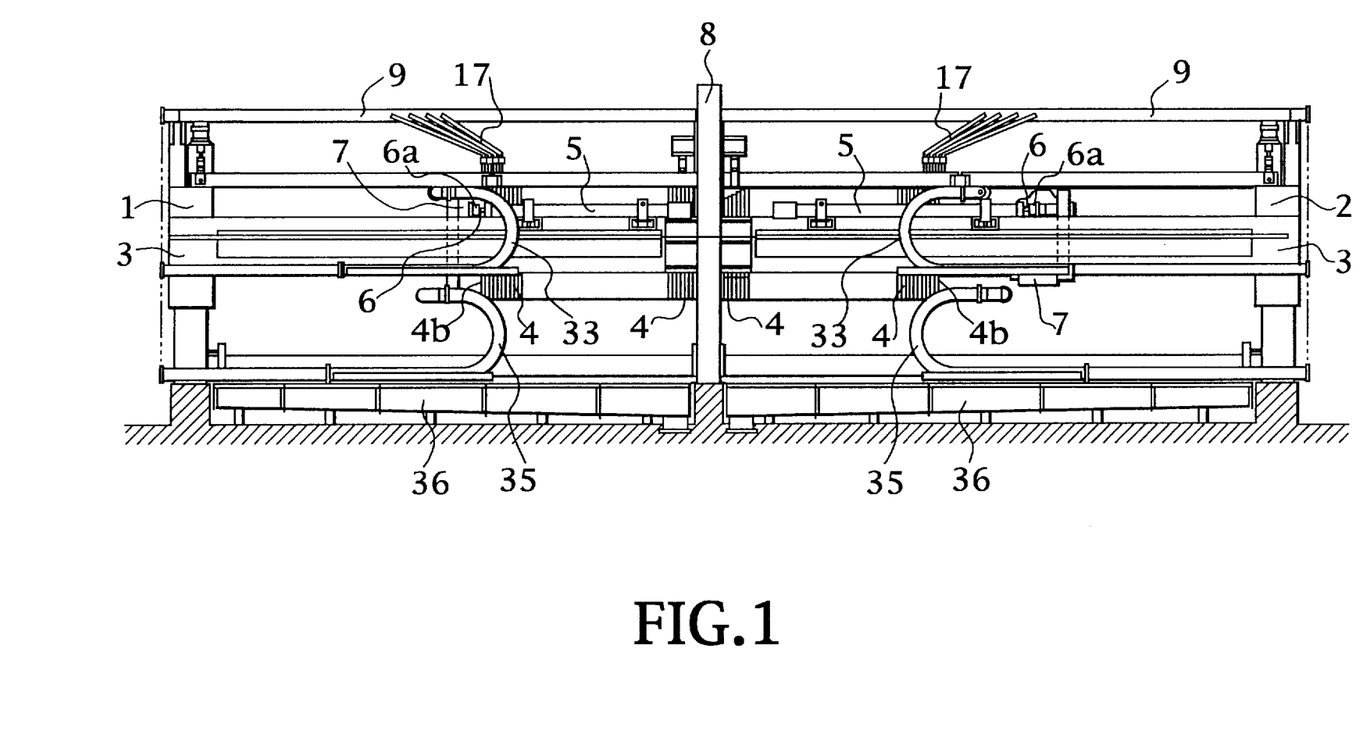
FIG. 1 is a schematic side view showing a filter press having an apparatus for regenerating filter clothes according to the present invention.
Figure 2:
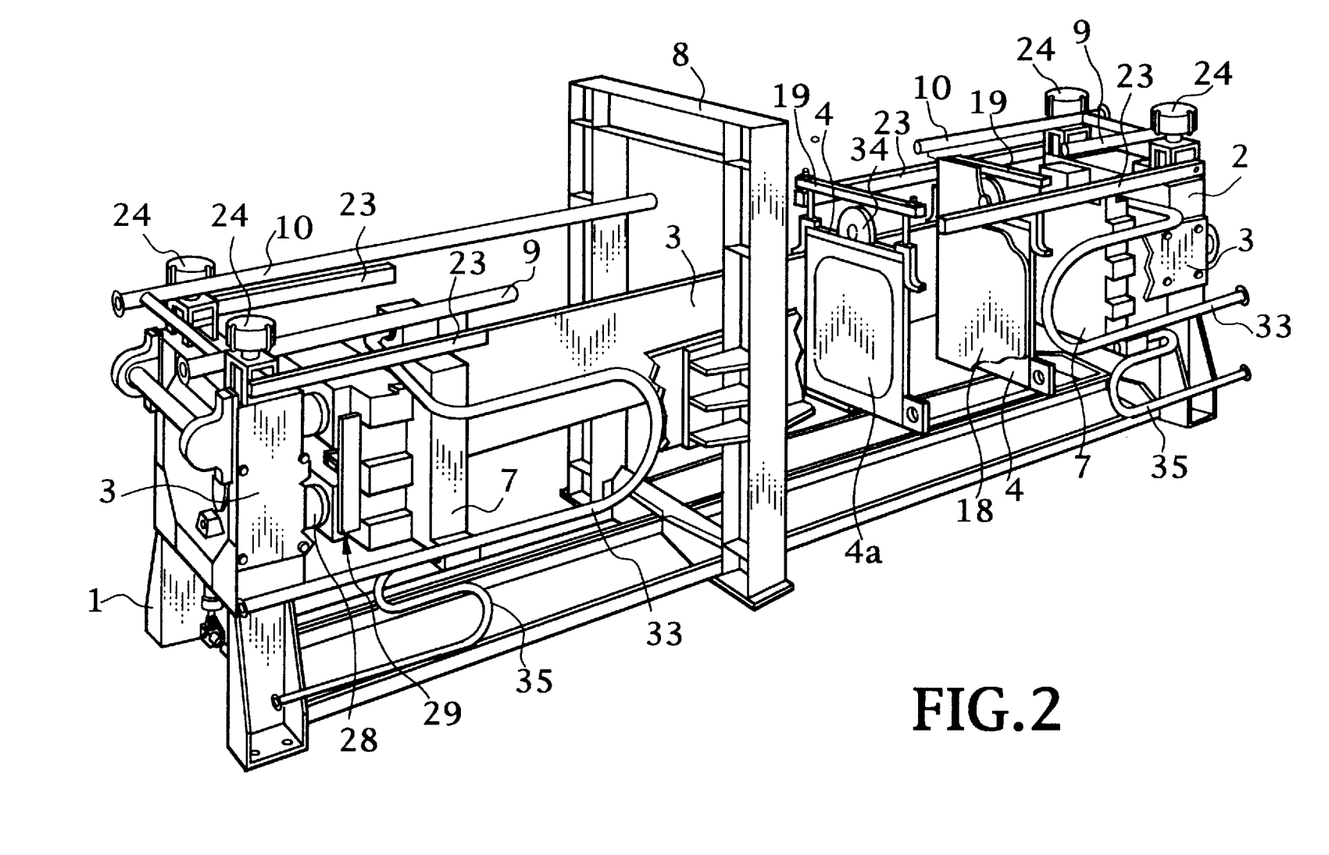
FIG. 2 is a perspective view of FIG. 1.
Figure 3:
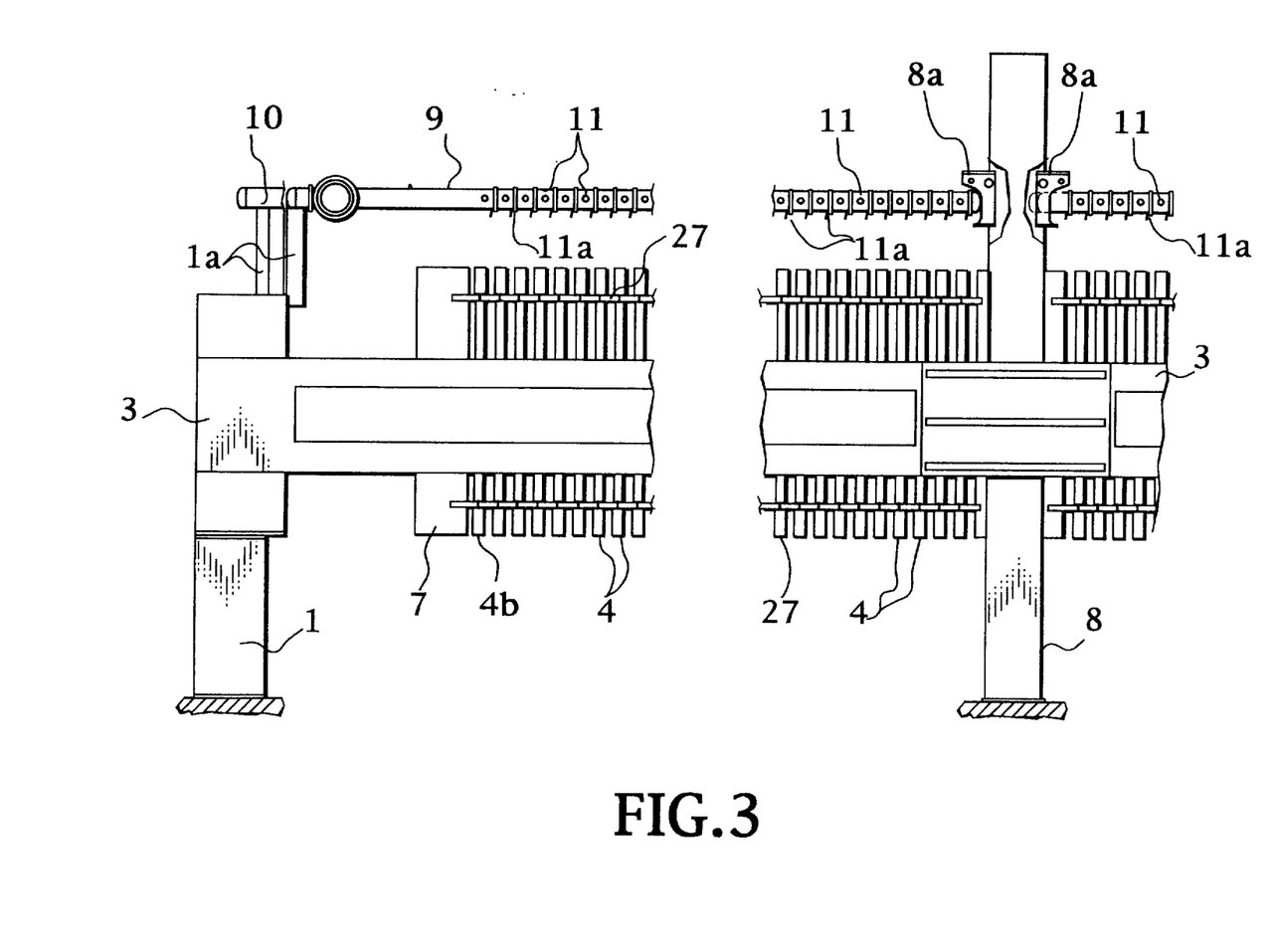
FIG. 3 is a partial side view of FIG. 1 showing the relative position between the washing pipes and the filter plates.
Figure 4:
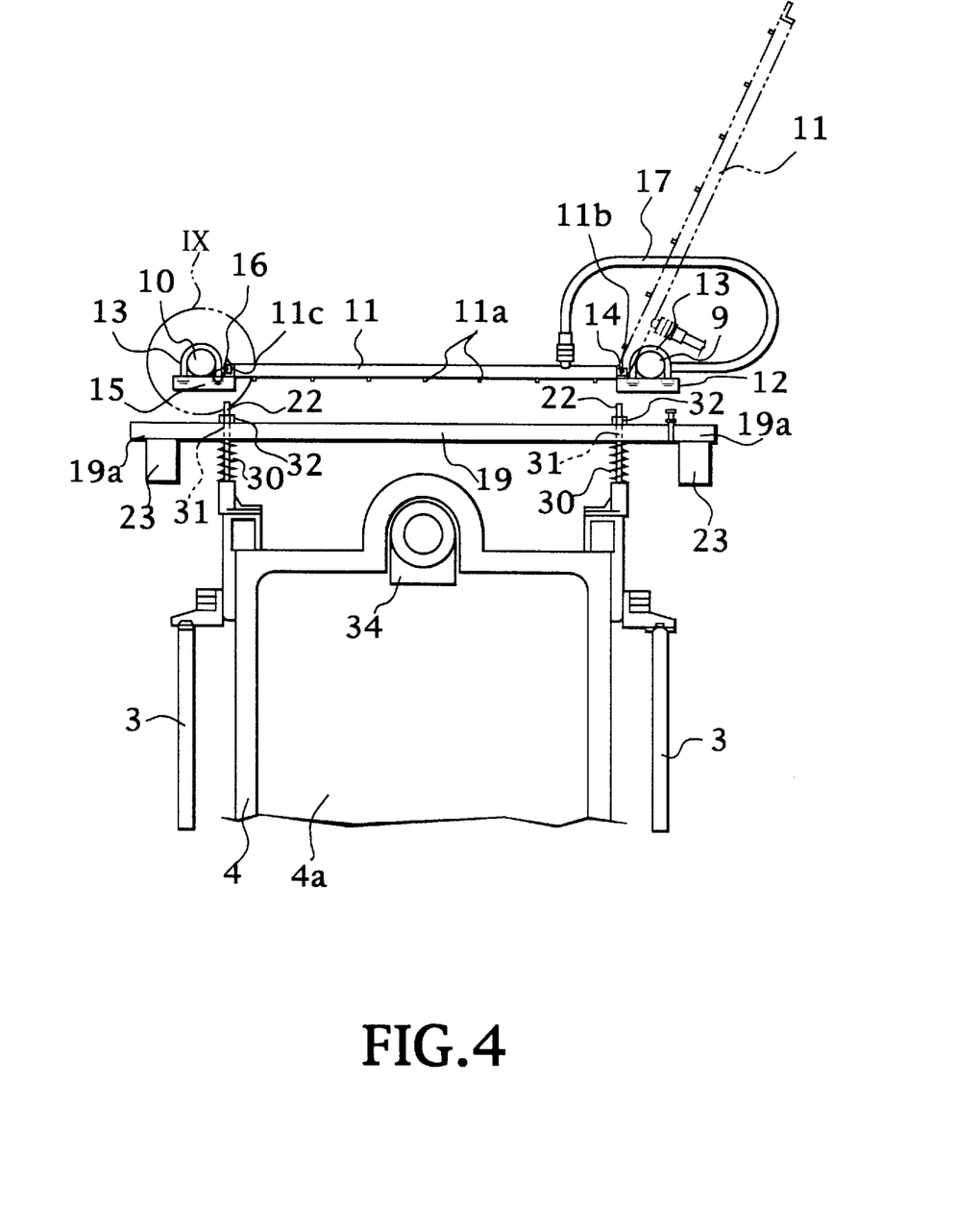
FIG. 4 is a front view showing an essential portion of FIG. 1.

FIG. 1 is a schematic side view showing a filter press according to the present invention, and FIG. 2 is a perspective view of FIG. 1. FIG. 3 is a partial side view showing the positional relationship between a washing pipe and a filter plate, and FIG. 4 is a front view showing an essential portion shown in FIG. 1.

As shown in FIGS. 1 and 2, the main body of the filter press has a left frame 1 and a right frame 2 respectively located at the right and left positions; a pair of plate-like guide rails 3 horizontally extending between the near position of FIG. 2 to the far position of the same; and an intermediate frame 8 disposed at a substantially intermediate position between the two frames 1 and 2. A multiplicity of filter plates 4 are, in parallel and movably, mounted on the guide rails 3. Moreover, a movable head 7 is mounted on the right and left frames 1 and 2 at a position in a direction in which the filter plates 4 are opened in such a manner that the movable head 7 is able to move forwards and rearwards in the same direction as the filter plates 4. The intermediate frame 8 is provided to correspond to a structure in which a multiplicity of the filter plates 4 are provided in parallel in order to improve the filtering performance. An opening/closing mechanism, a clamping mechanism, a washing mechanism and the vibrating mechanism, each of which will be described later, are disposed substantially symmetrically in the right and left directions (in the portions respectively adjacent to the left frame 1 and the right frame 2) with respect to the intermediate frame 8.

Figure 13A:
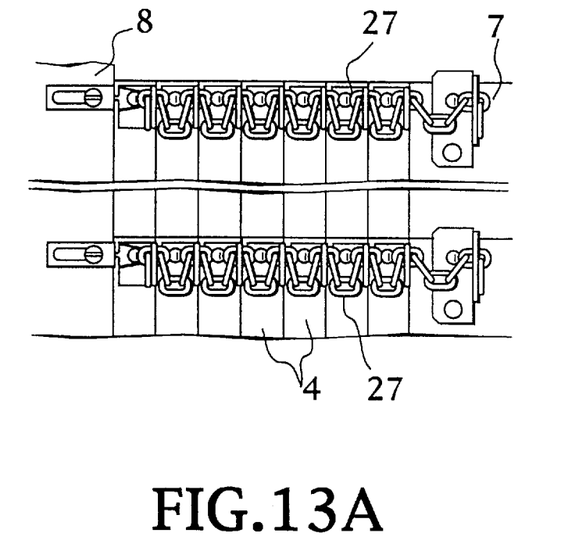
FIG. 13A is a side view showing a state of a link chain in a state where the filter plates are closed.
Figure 13B:
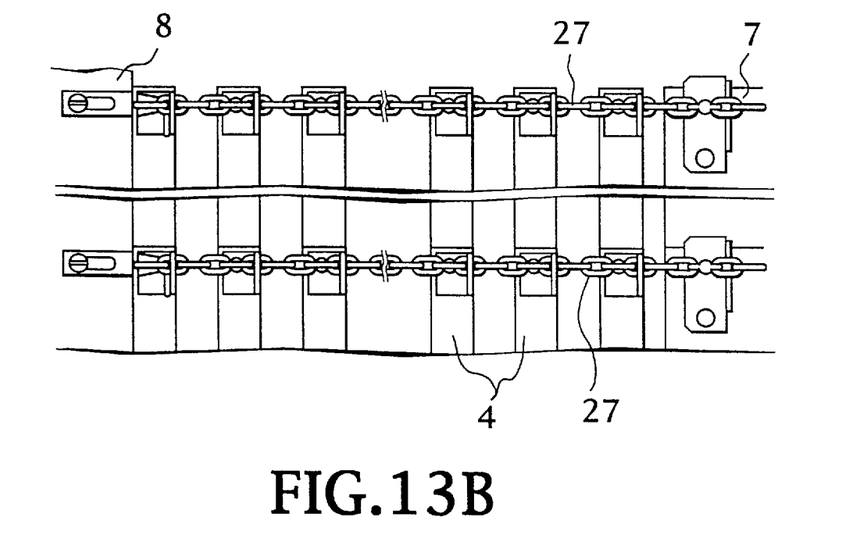
FIG. 13B is a side view showing a state of the link chain in a state where the filter plates are opened.

As shown in FIG. 1, a hydraulic cylinder 5 including a hydraulic piston 6 for opening and closing the filter plates 4 is secured to the guide rails 3. The hydraulic cylinder 5 includes the hydraulic piston 6 which has a head portion 6a capable of moving forwards and rearward along the guide rails 3. The movable head 7 is attached to the head portion 6a, the movable head 7 being connected to an outermost filter plate 4b in the opening direction. The filter plates 4 are connected to one another by a link chain 27 (see FIGS. 3, 13A and 13B). When the movable head 7 is moved forwards or rearwards by the hydraulic piston 6 of the hydraulic cylinder 5, all of the filter plates 4 are simultaneously opened or closed through the link chain 27. As a result, the intervals among the filter plates 4 in the opened state are controlled to be substantially the same by the link chain 27. That is, the hydraulic cylinder 5, the movable head 7 and the link chain 27 form the opening/closing mechanism according to this embodiment.

The clamping mechanism for applying a required pressure is connected to the movable head 7. As shown in FIG. 2, the clamping mechanism has a clamping cylinder 28 arranged to be operated by hydraulic pressure and a locking unit 29 for maintaining the clamping state. The above-mentioned clamping mechanism mutually clamps the filter plates 4 which are closed so that the adjacent filter plates 4 are brought to a sealed state. Thus, filtering chambers are formed.

The filtering chambers each of which is formed between the filter plates 4 will now be described.

Figure 5:
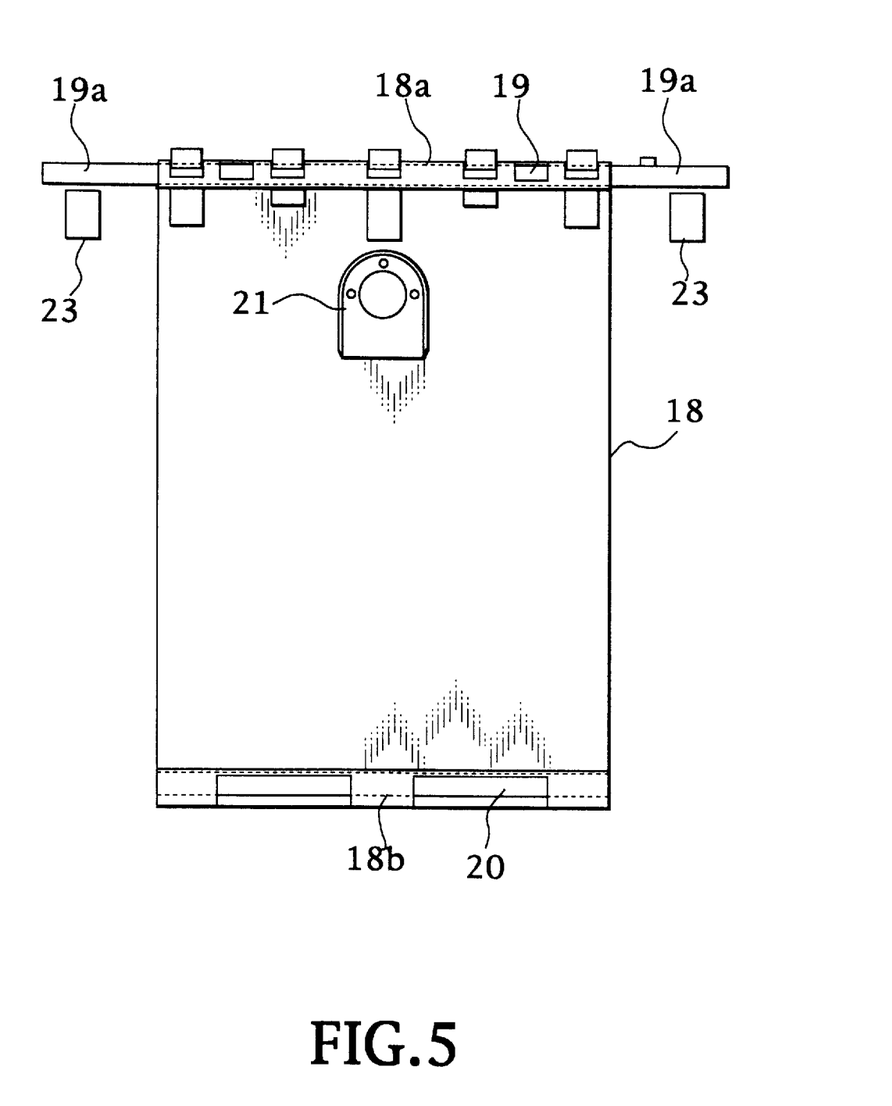
FIG. 5 is a front view of FIG. 1 showing a state where filter clothes are hung.

As shown in FIG. 2, a concave filtering surface 4a is formed on each of right and reverse sides of each of the filter plates 4. A filter cloth 18 is put on the filtering surface 4a. As shown in FIG. 5, bag portions 18a and 18b respectively are formed in the upper and lower ends of the filter cloth 18. An upper-portion support bar 19 is inserted into the upper bag portion 18a, while a weight 20 is inserted into the lower bag portion 18b. The upper-portion support bar 19 has two ends 19a projecting over the two ends of the filter cloth 18.

As shown in FIG. 4, support columns 22 are stood erect over the two shoulder portion at the right and left positions of the filter plate 4. A coil spring 30 is disposed around each of the support columns 22. Each of two ends 19a of the upper-portion support bar 19 has a through hole 31 through which the support column 22 is inserted. In a state where the support column 22 is inserted into the through hole 31, two ends 19a of the upper-portion support bar 19 are elastically supported by springs 30. A nut 32 for preventing separation of the upper-portion support bar 19 is, by threads, received at the top end of the support column 22. That is, the top end of the filter cloth 18 (see FIG. 5) is elastically supported by the through hole 31 through the upper-portion support bar 19 and the support columns 22. On the other hand, the lower end of the filter cloth 18 is hung to the lower portion of the filter plate 4 by the weight 20 (see FIG. 5). When the filter plates 4 have been closed and thus the adjacent filter plates 4 have been joined up, a filtering chamber is formed between adjacent filter plates 4 (between opposite filtering surfaces 4a) in a state where the filtering surface 4a is covered with the pair of the filter clothes 18.

As shown in FIG. 4, an undiluted-solution supply portion 34 is formed in the upper portion of each of the filter plates 4, the undiluted-solution supply portion 34 being allowed to communicate with the undiluted-solution supply passage 33 (see FIGS. 1 and 2) in a state where the filter plates 4 are closed to supply slurry (the undiluted solution) intended to be filtered. As shown in FIG. 5, a solution supply plate 21 for supplying the slurry from the undiluted-solution supply portion 34 to the filter cloth 18 is attached to the upper central portion of the filter cloth 18. On the other hand, a solution discharge portion (not shown) allowed to communicate with the filtrate discharge passage 35 (see FIGS. 1 and 2) in a state where the filter plates 4 are closed to discharge filtered solution is formed in the lower portion of each filter plate 4.

A mechanism for washing the intermediate frame 8 will now be described.

As shown in FIG. 4, a main supply pipe 9 for supplying water for washing the filter clothes 18 (see FIG. 5) and a support pipe (a portion for supporting a washing pipe) 10 running parallel to the main supply pipe 9 are disposed above the right and left shoulders of the filter plates 4, the main supply pipe 9 and the support pipe 10 being disposed in the direction of the filter plates 4. Washing pipes 11 having a multiplicity of nozzles 11a are disposed between the main supply pipe 9 and the support pipe 10 to extend in the direction of the filtering surface 4a of each of the filter plates 4. The base (an end) of the washing pipes 11 and a leading end (another end) of the same respectively have an engaging projection 11b and an engaging member 11c (see FIG. 6). The engaging projection 11b is detachably supported by the main supply pipe 9, while the engaging member 11c is detachably supported by the support pipe 10.

The main supply pipe 9 and each of the washing pipes 11 are connected to each other in a communicated state by a tube (a flexible pipe) 17 made of a flexible tube. Thus, washing water is supplied from the main supply pipe 9 to each of the washing pipes 11 through the tube 17. Note that a dripping pan 36 (see FIG. 1) for receiving sprayed washing water is disposed below the filter plate 4.

Each of the washing pipes 11 is disposed above the substantial center of a gap formed between opened filter plates 4. The nozzles 11a are disposed to spray washing water to the surfaces of the filter clothes 18 respectively put on the filtering surfaces 4a on the right and reverse sides of each of the filter plate 4. The two ends of the main supply pipe 9 and those of the support pipe 10 are supported by support bracket 1a provided for the right and left frames 1 and 2 and the brackets 8a provided for the intermediate frame 8 (see FIG. 3).

The structure for attaching the washing pipes 11 will now be described with reference to FIGS. 4 and 6 to 11.

Figure 6:
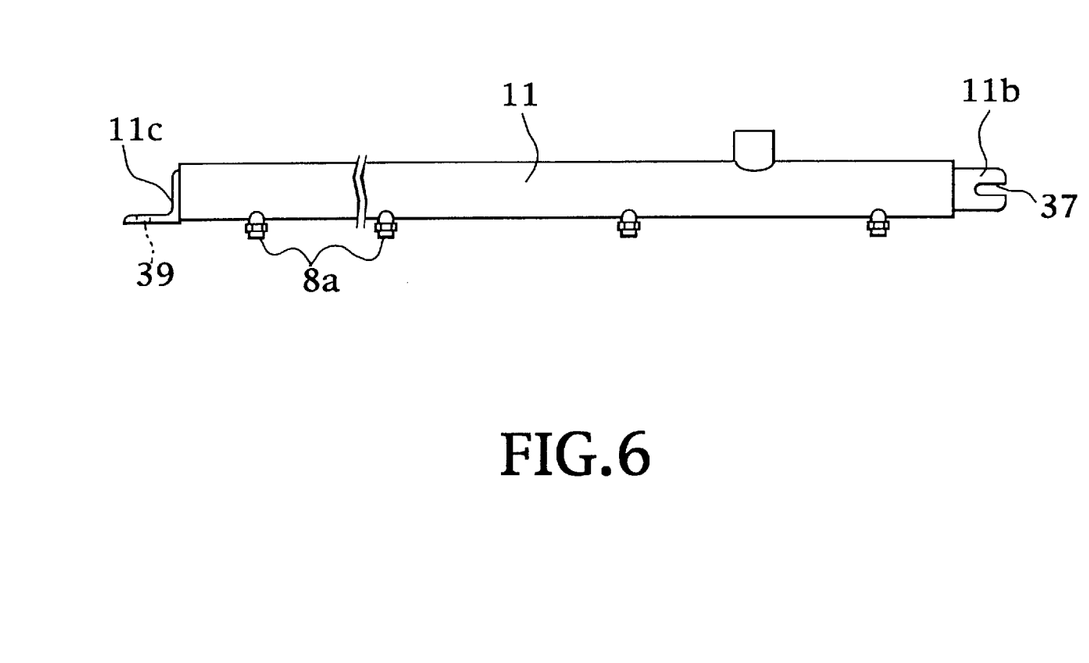
FIG. 6 is a side view of FIG. 1 showing a washing pipe.
Figure 7:
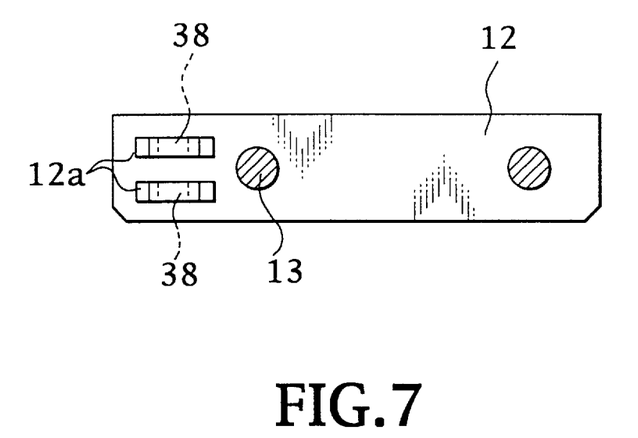
FIG. 7 is a plan view showing a bracket for attaching the base of the washing pipe.
Figure 8:
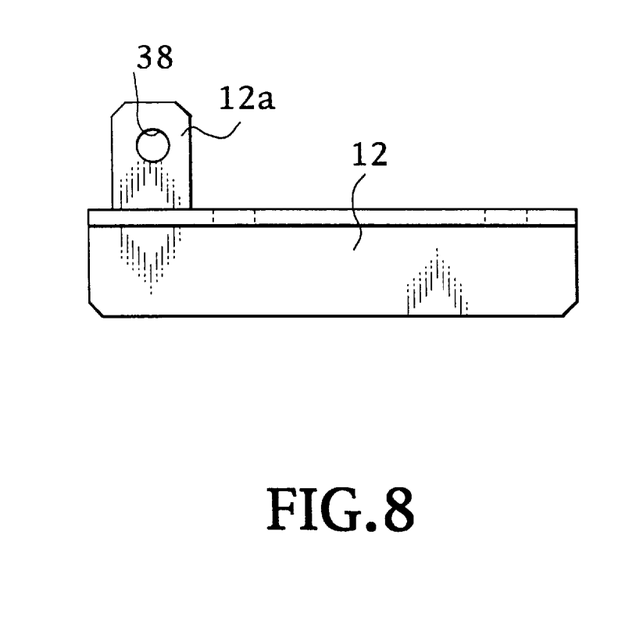
FIG. 8 is a plan view showing a bracket for attaching the base of the washing pipe.

As shown in FIG. 6, the engaging projection 11b formed at the base of the washing pipe 11 is formed into a plate-like shape having a groove portion 37 cut from the leading end thereof. The depth of the groove portion 37 is determined to permit the washing pipe 11 to be moved from the normal attached position toward the base. To correspond to this, a bracket 12 having an angle cross sectional shape is attached to the main supply pipe 9 by a U-bolt 13, as shown in FIG. 4. As shown in FIGS. 7 and 8, the bracket 12 has a pair of stoppers 12a stood erect from the bracket 12 and disposed apart from each other to permit the engaging projection 11b to be inserted. Each stopper 12a has an insertion hole 38. By inserting the engaging projection 11b between the stoppers 12a and by inserting a pin 14 into the insertion hole 38 and the groove portion 38, the base of the washing pipe 11 is secured.

Figure 9:
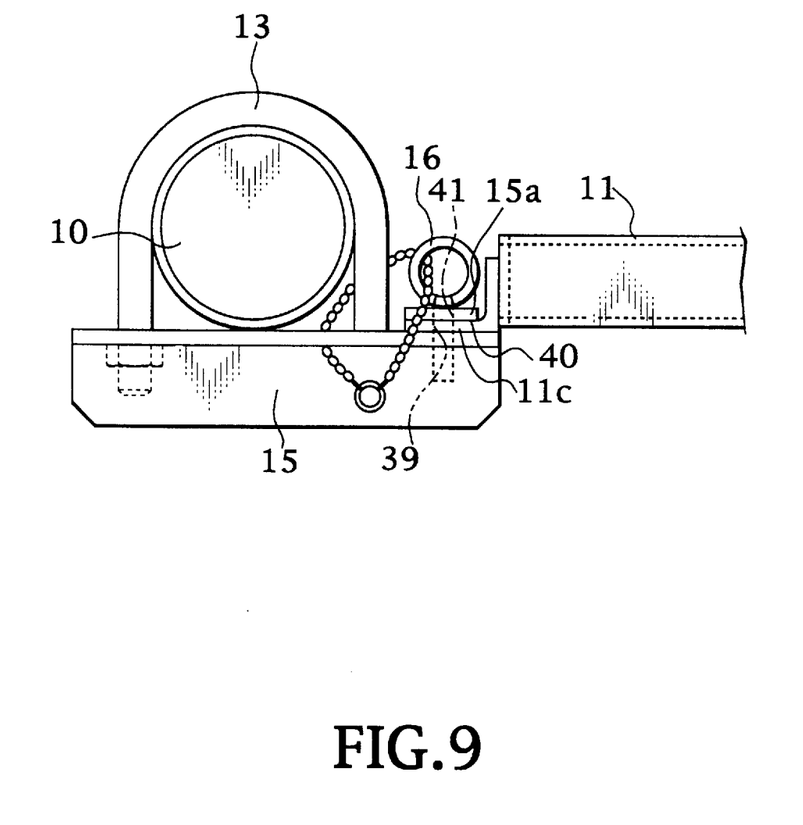
FIG. 9 is an enlarged front view of portion IV of FIG. 4 showing a state where the leading end of the washing pipe is engaged.
Figure 10:
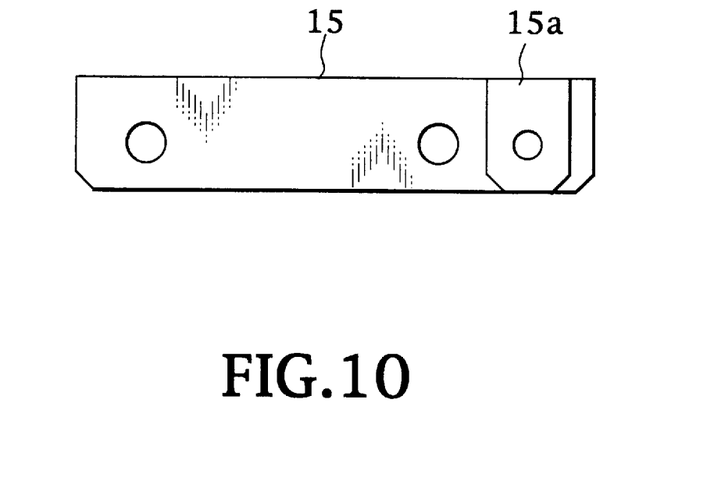
FIG. 10 is a plan view showing the bracket for attaching the base of the washing pipe.
Figure 11:
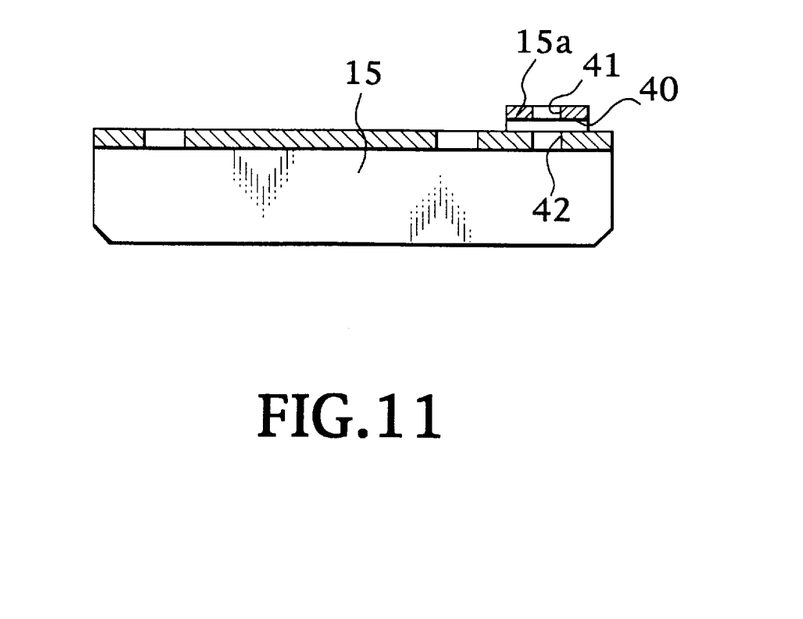
FIG. 11 is a front view showing the bracket for attaching the base of the washing pipe.

As shown in FIG. 6, the engaging member 11c disposed at the leading end of the washing pipe 11 is formed into an L-shape having an engaging hole portion 39. To correspond to this, a support bracket 15 having an angle cross sectional shape is attached to the support pipe 10 by the U-bolt 13, as shown in FIGS. 4 and 9. As shown in FIGS. 10 and 11, the support bracket 15 has an engaging member 15a having an L-shape cross section for forming a predetermined gap 40 from the support bracket 15 for permitting an engaging member to be inserted. The engaging member 15a and the support bracket 15 have holes 41 and 42 which form a through hole together with the engaging hole portion 39 (see FIG. 6) of the engaging member 11c inserted into the gap 40. When the engaging member 11c is inserted into the gap 40 and a pin 16 is inserted into the engaging hole portion 39 and the holes 41 and 42, the leading end of the washing pipes 11 is secured.

Thus, the attached washing pipe 11 can easily be removed from a position above the filter plate 4 by removing the pin 16 inserted into the leading end of the washing pipes 11, by moving the overall body of the washing pipes 11, by removing the engaging member 15c at the leading end of the washing pipes 11 from the gap 40 and by upwards rotating the washing pipes 11 relative to the pin 14 in the base portion as indicated by an alternate long and two dashes line shown in FIG. 4. Thus, maintenance, such as change of the filter cloth 18, can easily be performed.

The mechanism for vibrating the upper-portion support bar 19 will now be described.

As shown in FIG. 4, a vibration rod 23 is disposed on the lower surface of the two ends 19a of the upper-portion support bar 19 in such a manner that the vibration rod 23 faces the lower surface from a lower position. The vibration rod 23 is vibrated vertically by a lift mechanism 24 (see FIG.

2) to be brought into contact with the two ends of the upper-portion support bar 19 from a lower position and separated from the same downwards so as to vibrate the upper-portion support bar 19 and the filter clothes 18 supported by the upper-portion support bar 19. The vibration rod 23 is structured such that the two ends of the vibration rod 23 are operated individually.

The apparatus according to the present invention has the above-mentioned structure to regenerate the filter clothes 18 clogged after a filtration operation has been performed such that the piston rod 6 is extended to open the filter plates 18. When the filter plates 4 have been opened, each filtering chamber between the filter plates 4 are opened so that cakes, which can easily be separated, are separated due to the dead weight.

In a case where cakes which have not fallen due to the dead weight and thus the cakes are left on the filter clothes 18, the vibration rod 23 is moved upwards so as to be brought into contact with the upper-portion support bar 19 in order to vibrate the filter clothes 18. Thus, cakes allowed to adhere to the filter clothes 18 and left on the same can be separated and dropped.

Since the two ends of the upper-portion support bar 19 are operated individually, the upper-portion support bar 19 and the filter clothes 18 can vibrated strongly. Thus, cakes allowed to adhere to the filter clothes 18 can efficiently be separated and removed.

That is, cakes, which can easily be separated, can be removed by opening the filter plates 4 and by vibrating the filter clothes 18.

Washing water is, from the nozzles 11a of the washing pipes 11, sprayed to cakes left from separation even after vibrated and allowed to adhere to the filter clothes 18 because of clogging in the textures of the filter clothes 18 after separated and dropped cakes have been removed. Thus, even cakes clogged in the textures of the filter clothes 18 can be removed.

As described above, cakes, which can easily be separated, can be removed by opening the filter plate 4 and applying vibrations to the filter clothes 18 so that the filter clothes 18 are easily be regenerated. In a case where cakes clogged in the textures of the filter clothes 18 are left, washing is performed so that the filter clothes 18 are satisfactorily be regenerated. Therefore, the filter clothes can accurately and satisfactorily be regenerated to correspond to various conditions of the cakes.

When the filter clothes 18 are regenerated, the present invention has the structure such that all of the filtering chambers are simultaneously opened to separate and drop a cake in each filtering chamber and to wash the filter cloth 18 in each filtering chamber. Therefore, the operations can significantly efficiently be performed as compared with the conventional structure arranged to perform the process for each chamber or a group of several chambers. That is, the above-mentioned batch type filter press has the filtration efficiency which is calculated as the time in which no filtrate nor cake is discharged as a result of the operation of the apparatus. The regenerating apparatus according to the present invention has the structure such that separation of cakes and washing of the filter clothes are simultaneously performed in all of the filtering chambers. Therefore, the time, in which the solid-liquid separation is not performed, can significantly be shortened so that a significantly excellent filtration efficiency is obtained. Moreover, since the regenerating apparatus according to the present invention has both of the separation function and washing function, an adequate operation can be selected to correspond to cakes of various slurry pieces.

In the mechanical view point, the structure according to the present invention in which the washing pipes 11 is secured to a fixed position (the substantially central position of the gap) between the opened filter plates 4 enables the position of the washing pipes 11 with respect to the opened filter clothes 18 to be maintained. Therefore, the nozzles 11a can be pointed to the portions of the filter clothes 18 required to be washed more accurately as compared with the conventional structure in which the washing operation is performed while moving the washing pipes 11. Since the filter clothes 18 are vibrated such that the vibration rod 23 is instantaneously brought into contact with the upper-portion support bar 19 of each of the filter clothes 18, the vibration efficiency can significantly be improved.

Since the structure for supporting the washing pipes 11 is arranged as illustrated, the washing pipes 11 can easily be removed at a position above the filter plate 4. Therefore, adjustment of the direction, in which the nozzles 11a sprays water, and maintenance of the nozzles 11a, such as change, can easily be performed.

Since the mechanism for opening and closing the filter plate 4 is provided individually from the clamping mechanism, the size of the apparatus can be reduced as compared with a structure in which the movable stroke of a clamping cylinder 28 of a clamping mechanism having a large scale hydraulic unit is set to be a large stroke to open and close the filter clothes. Moreover, the filter plate 4 can quickly be opened and closed. Therefore, the regenerating operation can furthermore efficiently be performed.

Figure 12:
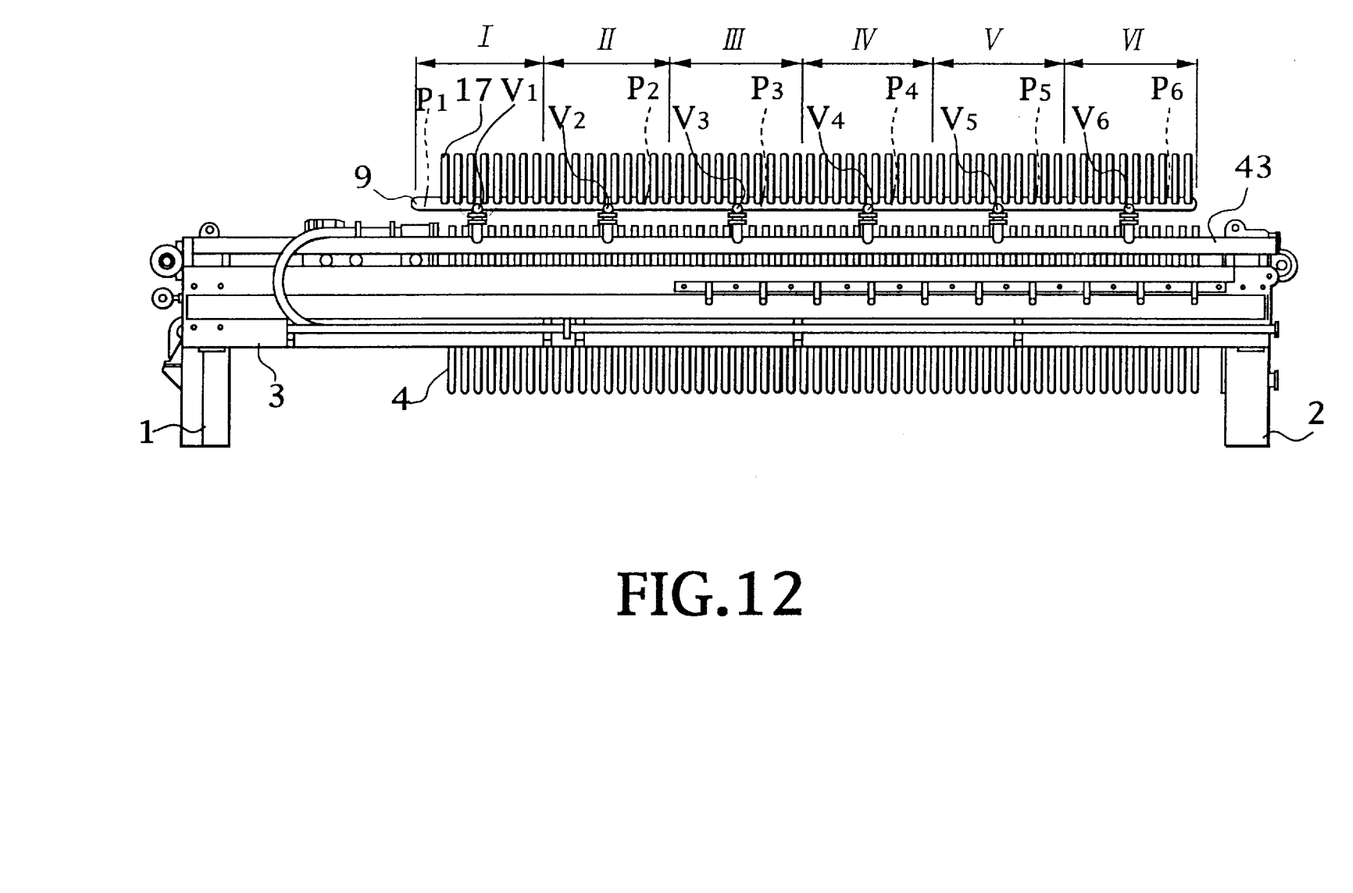
FIG. 12 is a side view showing a modification of a regenerating apparatus for a filter press shown in FIG. 1.

The filter plates 4 may be divided into six filter plate blocks (I to VI) each of which is composed of plural filter plates 4, as shown in FIG. 12. In this case, the inside portion of the main supply pipe 9 is divided into six washing water passage pipes P1 to P6 capable of independently supplying washing water to corresponding blocks (I to VI). Moreover, opening and closing valves V1 to V6 respectively are disposed between the washing water passage pipes P1 to P6 and a washing water supply passage 43 for supplying washing water to the washing water passage pipes P1 to P6.

As a result of employment of the above-mentioned structure, the filter clothes 18 can be washed such that the opening and closing valves V1 to V6 may selectively be opened which correspond to the divided blocks I to VI required to be washed. Therefore, the size of the pump for pumping washing water can be reduced and thus the apparatus can be formed with a low cost. That is, a filter press according to the present invention is able to eliminate a necessity of washing the filter clothes for each batch. The filter clothes are required to be washed when the filter clothes have been clogged excessively. If the filter clothes are divided into 6 blocks arranged to sequentially be washed as shown in FIG. 12, the discharge of the washing water pump can be reduced to one-sixth as compared with a structure in which the filter clothes are washed simultaneously. Moreover, the quantity of washing water can be saved.

What is claimed is:

1. A filter press comprising:

a pair of vertical frame members;

a pair of horizontal guide rails;

wherein one guide rail interconnects said frame members on one lateral side thereof and the other guide rail interconnects said frame members on the other lateral side thereof;

a plurality of filter cloths each having a pair of upper ends;

a plurality of filter plates each having opposed vertically oriented filtering surfaces, the plates movably disposed in parallel on the guide rails, each of the filter clothes covering the opposed filtering surfaces of a respective one of the filter plates;

a plurality of horizontal upper-portion support bars each having two ends, wherein each said support bars is disposed directly above and is parallel to the filtering surfaces of a respective one of the filter plates;

means for resiliently connecting each said support bar to an upper end of a respective said filter plate;

connecting means for connecting the upper ends of each said filter cloth to a respective one of said support bars so that the filter cloth covers the opposed filtering surfaces of a respective filter plate;

an opening and closing mechanism for connecting the filter plates to one another and simultaneously opening or closing a plurality of the filter plates;

wherein filtering chambers are formed between adjacent filtering surfaces of adjacent filter plates when the filter plates are closed and which are opened when the filter plates are opened;

a horizontal main supply pipe for supplying washing water connected to one lateral side of said frame members and extending parallel to said guide rails and located above the upper-portion support bars;

a support pipe connected to the other lateral side of said frame members and extending parallel to said guide rails and located above the upper-portion support bars;

washing pipes disposed above and extending parallel to the upper-portion support bars and extending between the supply pipe and the support pipe, each of the washing pipes disposed above a gap between the filter plates when opened;

first connecting members, each of which pivotably connects one end of each of the washing pipes with the main supply pipe;

second connecting members, each of which detachably connects the other end of the washing pipe with the support pipe;

flexible pipes, each of which connects the main supply pipe and a respective one of the washing pipes to each other in a communicated state so as to supply washing water from the main supply pipe to each of the washing pipes;

nozzles provided for each of the washing pipes to spray washing water to each of the filter cloths; and a pair of vibration rods for vibrating the upper portion-support bars, one of the vibration rods being connected to one lateral side of the frame members for contact with one of the ends of the support bars and the other vibration rod being connected to the other lateral side of the frame members for contact with the other end of the support bars.

2. A filter press according to claim 1, wherein the opening and closing mechanism includes a hydraulic cylinder, a movable head, and a link chain, and the hydraulic cylinder is secured to the guide rails and includes a hydraulic piston moved forwards and rearwards along the guide rails, the movable head is attached to a head of the hydraulic piston and connected to one of the outer filter plates, and the link chain connects the filter plates to one another.

3. A filter press according to claim 1, wherein all of the filter plates are grouped into plate groups, each of the plate groups including a plurality of filter plates, and the main supply pipe has a plurality of washing water passage pipes capable of independently supplying washing water to each of the plate groups.

4. A filter press according to claim 1, further comprising a lift mechanism engaged with each end of the vibration rods for vibrating the vibration rods individually.

5. A filter press according to claim 1, wherein each of the first connecting members includes a plate portion provided at one end of each of the washing pipes, a bracket provided for the main supply pipe, and a pin, and the plate portion is disposed at a right angle to the guide rails and has a groove, the bracket has a gap in which the plate portion is inserted, and the pin is supported by the bracket within the gap and inserted in the groove as the plate portion is inserted in the gap.

6. A filter press according to claim 1, wherein each of the second connecting members includes a plate portion provided at the other end of each of the washing pipes, a bracket provided for the support pipe, and a pin, and the plate portion is disposed in parallel to the washing pipes and has a first hole, the bracket has a gap in which the plate portion is inserted and a second hole corresponding to the first hole as the plate portion is inserted in the gap, and the pin is detachably inserted in the first and second holes as the plate portion is inserted in the gap.

* * * * *